Feb. 21, 1956 N. N. ESTES 2,735,659
CONDENSER FOR CRYSTAL GROWING APPARATUS
Original Filed March 21, 1949 7 Sheets-Sheet 2
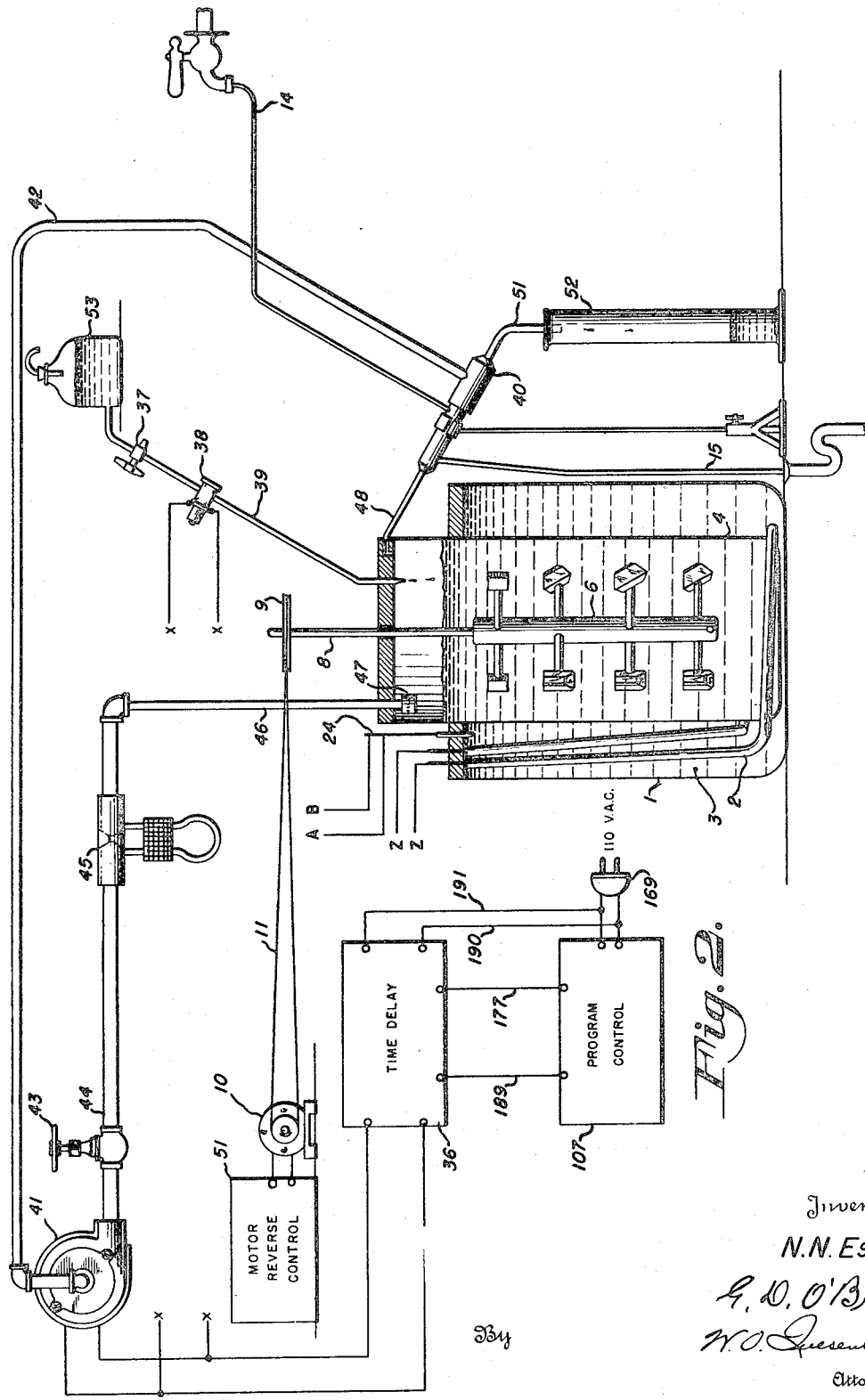
Inventor
N. N. Estes Feb. 21, 1956    N. N. ESTES    2,735,659
CONDENSER FOR CRYSTAL GROWING APPARATUS
Original Filed March 21, 1949    7 Sheets-Sheet 3
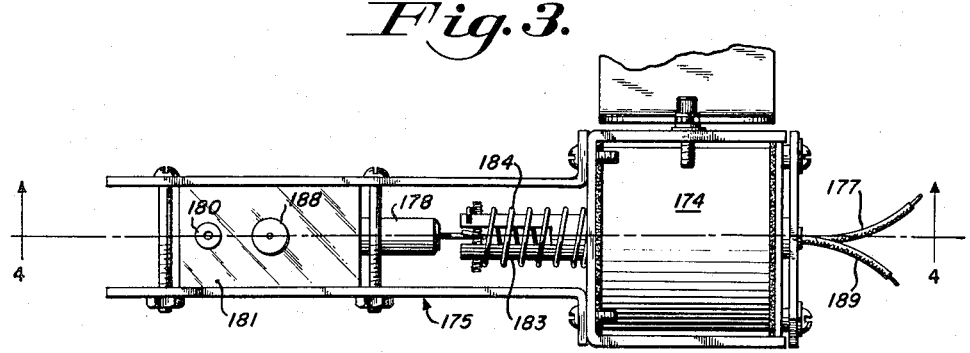
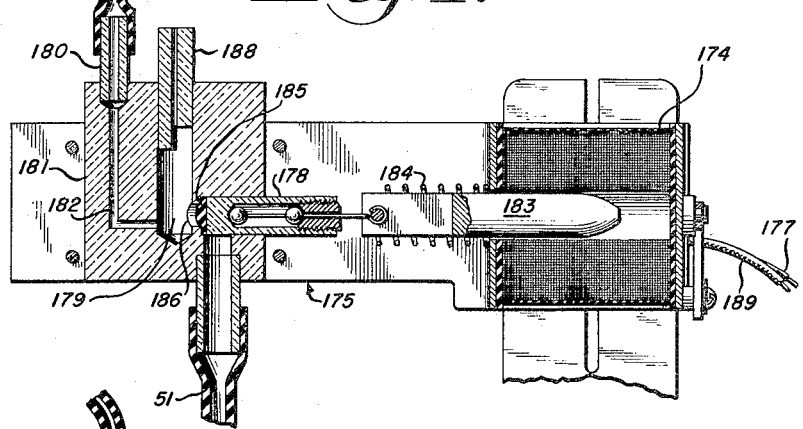
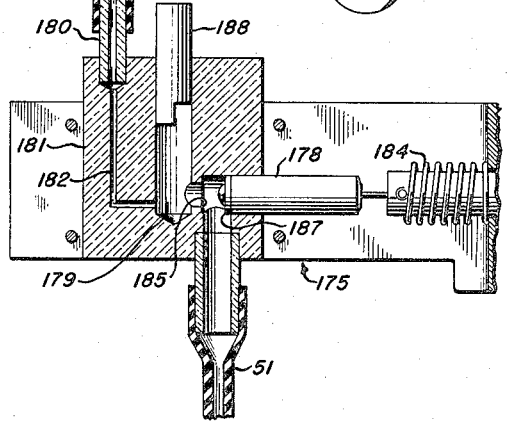
Inventor
N. N. Estes

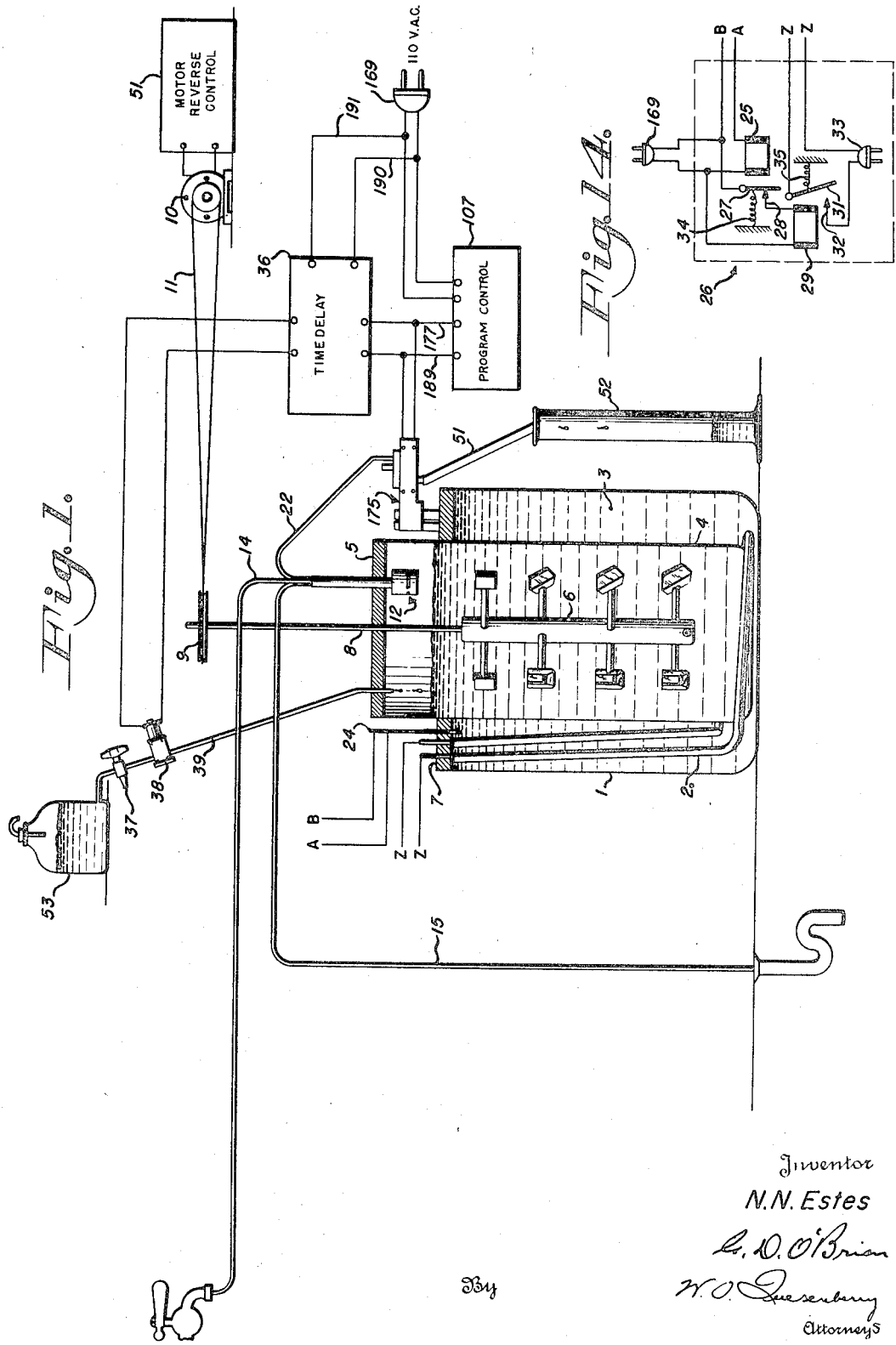

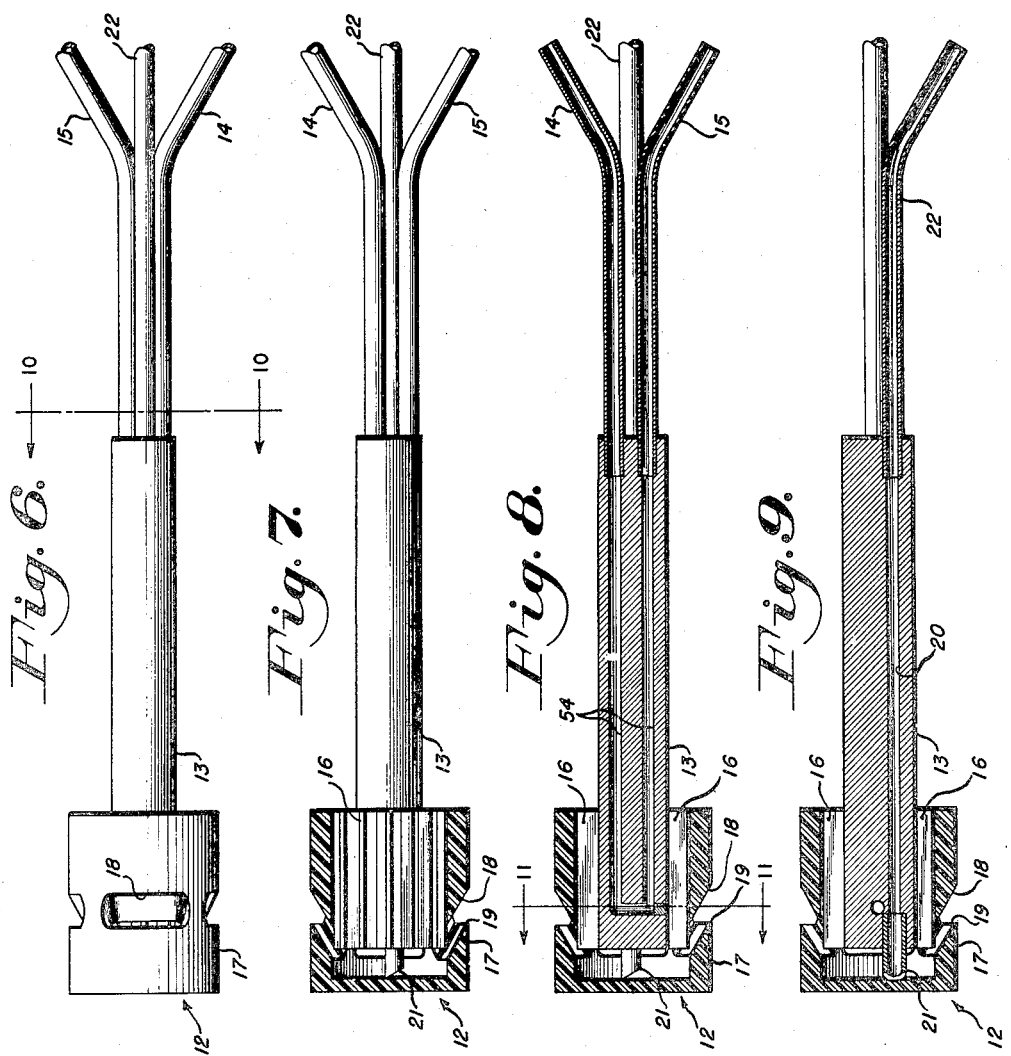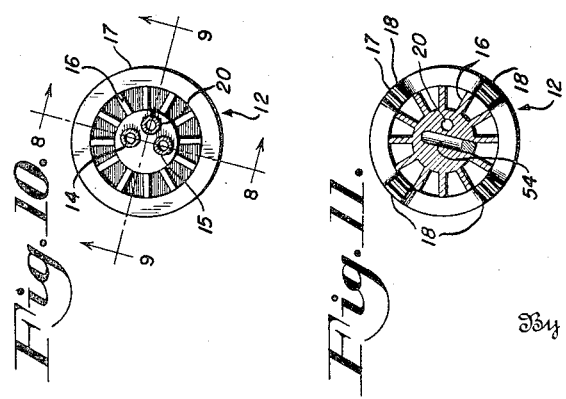

Feb. 21, 1956   N. N. ESTES   2,735,659
CONDENSER FOR CRYSTAL GROWING APPARATUS
Original Filed March 21, 1949   7 Sheets-Sheet 5

Inventor
N. N. Estes

Feb. 21, 1956 N. N. ESTES 2,735,659
CONDENSER FOR CRYSTAL GROWING APPARATUS
Original Filed March 21, 1949 7 Sheets-Sheet 7

Inventor
N.N. Estes

United States Patent Office 2,735,659
Patented Feb. 21, 1956

2,735,659

CONDENSER FOR CRYSTAL GROWING APPARATUS

Nelson N. Estes, Silver Spring, Md.

Original application March 21, 1949, Serial No. 82,675, now Patent No. 2,686,712, dated August 17, 1954. Divided and this application June 28, 1954, Serial No. 439,943

2 Claims. (Cl. 257—28)

(Granted under Title 35, U. S. Code (1952), sec. 266)

This invention relates to a condenser to be used in methods and apparatus for the production of clear and flawless crystals from materials that have a nearly flat or negative slope solubility curve such, for example, as lithium sulphate monohydrate. More specifically, the invention includes a method for growing clear and flawless crystals which involves steps for controlling the formation of spurious crystals due to evaporation at the surface of the solution comprising agitating the surface of the growing solution and condensing water vapor on areas of the container or crystal support above the growing solution to automatically dissolve crystals deposited thereon before growth starts and thereby prevent crystals from forming thereon. The invention also pertains to methods in which the size and flawless quality of the crystals are controlled by regulating the hydrogen ion concentration or pH value and the growing temperature of the crystallizing solution. The quality of the crystals with respect to flaws is further controlled by the method of cutting the crystal seeds from a crystal bar. The invention also includes apparatus for automatically maintaining the temperature pH value and the supersaturation of the solution within a narrow range during a predetermined program of crystal growth.

This application is a division of my copending application Serial No. 82,675, filed March 21, 1949, now Patent No. 2,686,712 granted August 17, 1954.

Methods of growing crystals from solutions with a positive slope solubility curve which have been heretofore proposed include methods whereby the crystallization is carried out either by lowering the temperature of the crystallizing solution without evaporation or by evaporation of the solution at constant temperature or a combination of both. The aforementioned methods apply only to those crystal materials, that have a positive slope solubility curve, such, for example, as Rochelle salt crystals. These methods have not been satisfactory for growing optically clear crystals from materials that have a flat or negative slope solubility curve such as lithium sulphate monohydrate for the reason that it has not been possible to obtain a sufficient rate of growth to be practical for growing these crystals free of internal strain. The novel methods and apparatus of the present invention for growing flawless crystals overcome to a large extent, the disadvantages of the prior art methods and apparatus. To grow clear and flawless crystals of lithium sulphate monohydrate by the methods of the present invention it is necessary to use seeds of this material that have faces parallel to the major natural faces of the crystal. Further, clear and flawless crystals of lithium sulphate monohydrate may be grown only when the hydrogen ion concentration or pH value and the temperature of the solution are maintained within narrow limits. Under these conditions clear and flawless growth occurs in length and width but growth does not occur in thickness. To obtain thicker seeds it is necessary to grow crystals in a solution having a pH value for the hydrogen ion concentration below the optimum. This causes strains to be developed in the crystals and results in an increase in thickness. The strains developed thereby also cause flaws and imperfections in the crystals. The flaws and imperfections which occur with seed planting and inherently produce rounded corners with initial immersion in the solution and of a well known character must be grown out by cutting seeds from the clearest sections and regrowing at the crystal corners, thereby resulting in crystal seed growths of increased thickness in a solution that produces flawless growths.

Apparatus for growing crystals which have been produced heretofore provide a constant supersaturation of a crystallizing solution with a positive slope solubility curve by evaporation of the solution at a constant temperature or by lowering the temperature without evaporation. The process of lowering the temperature without evaporation for a solution of lithium sulphate monohydrate has the disadvantage of requiring such a large amount of original solution, that program control means, based on temperature change, for maintaining a constant supersaturation would be impractical. The present invention, therefore, utilizes apparatus which controls the supersaturation of the crystallizing solution by evaporation of the solution at constant temperature.

In accordance with one embodiment of the invention, claimed in my copending application, Serial No. 82,675, a tank is provided having a cover on which is supported means comprising a vertical shaft with a plurality of arms for supporting the crystals grown thereon. Inside of said tank is mounted a condenser connected in siphon relation to dispensing means outside of said tank. Dispensing means are also provided outside of said tank for transferring make-up solution to the tank during the crystallizing process. An automatic program control system is connected to operate both of the dispensing means described herein in accordance with a predetermined schedule of operation.

An alternative embodiment of the invention, claimed in my copending application, identified as Navy Case No. 19,285, involves a blower system by which moisture laden air is conveyed from the tank to an external condenser, the period of operation of the blower being controlled by the afore-described program control system.

One of the objects of this invention is to provide a method and apparatus for growing clear and flawless crystals of a material having a flat or negative or slightly positive slope solubility curve.

Another object of the invention is to provide a method for growing clear and flawless crystals from a solution of a material that has a nearly flat or negative or slightly positive slope solubility curve and having provision for stirring the solution to develop frothless waves thereby to reduce the possibility of spontaneous seeding due to increased saturation resulting from evaporation at the surface of the solution.

A further object of the invention is to provide a method for growing clear and flawless crystals from an enclosed solution of a material that has a nearly flat or negative or slightly positive slope solubility curve and having provision for condensing water vapor on the portion of the enclosure above the surface of the solution thereby to reduce the saturation of solution washed up on this surface and thereby reduce the possibility of spontaneous seeding thereon.

Still another object of the invention is to provide clear and flawless crystals of predetermined dimensions from a material having a flat or negative or slightly positive slope solubility curve.

Another object resides in the provision of a method and apparatus for growing clear and flawless crystals from materials having the aforedescribed solubility characteristics under controlled conditions of hydrogen ion concentration.

Another object is to grow crystals of the afore-described characteristics in which provision is made for first growing a crystal along all axes and thereafter growing a crystal from a seed cut from a clear and flawless portion of the first crystal along certain axes with growth along at least one axis inhibited, thereby eliminating incipient flaws introduced during the first growth.

A primary object of this invention is to provide a novel condenser to be utilized in apparatus for growing clear and flawless crystals from a material having a flat or negative slope solubility curve.

Other objects and many of the attendant advantages of this invention will be readily appreciated as the same becomes better understood by reference to the following detailed description when considered in connection with the accompanying drawings wherein:

Fig. 1 is a diagrammatic view of a crystal growing system according to the preferred embodiment of the invention and employing a condenser positioned inside of the growing chamber;

Fig. 2 is a diagrammatic view of an alternative embodiment of the invention illustrating a condenser positioned outside of the growing chamber and a blower for circulating the air;

Fig. 3 is a top view of the device that dispenses water from the condenser in the growing chamber of Fig. 1;

Figs. 4 and 5 are views in section through the water dispensing device of Fig. 3 taken along the line 4—4;

Fig. 6 is a view of the condenser that is positioned inside the growing chamber of Fig. 1;

Figure 12:
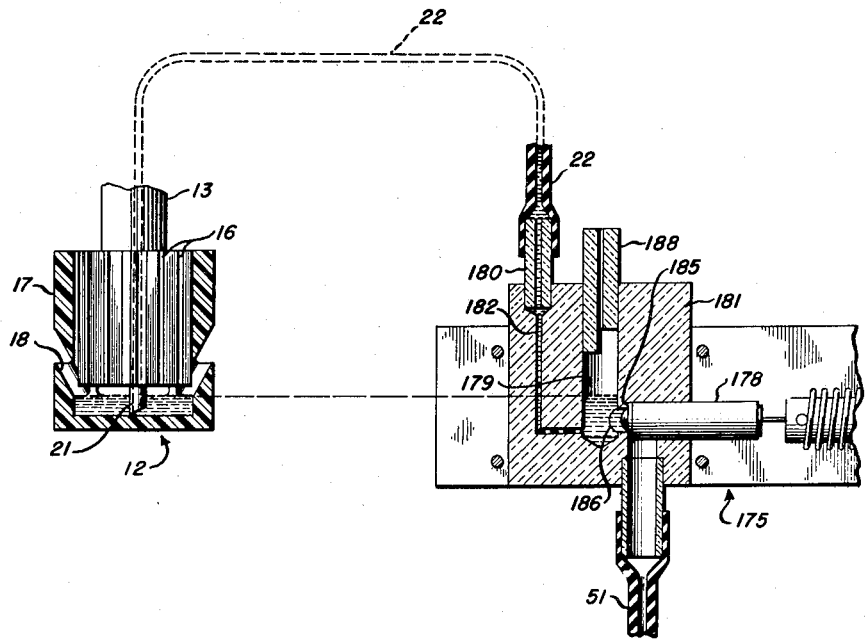
Figure 13:
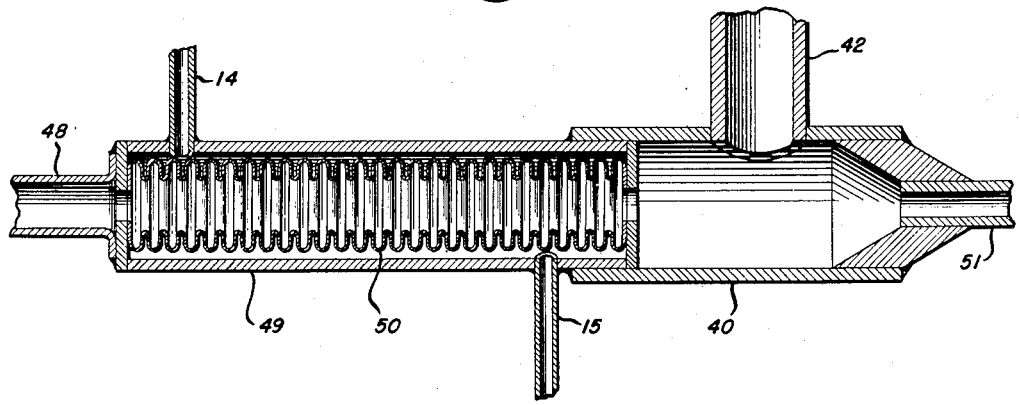
Figure 15:
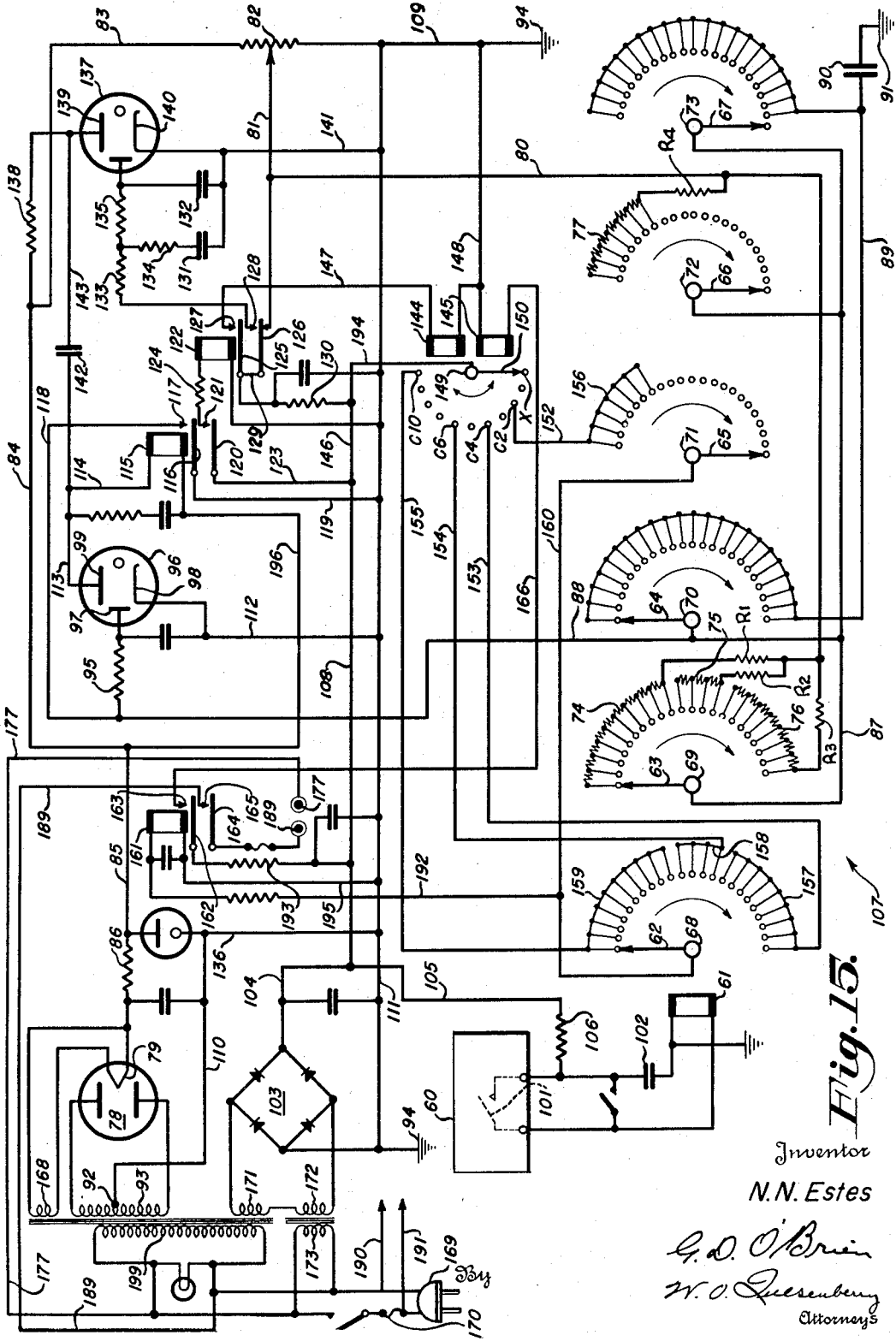
Figure 16:
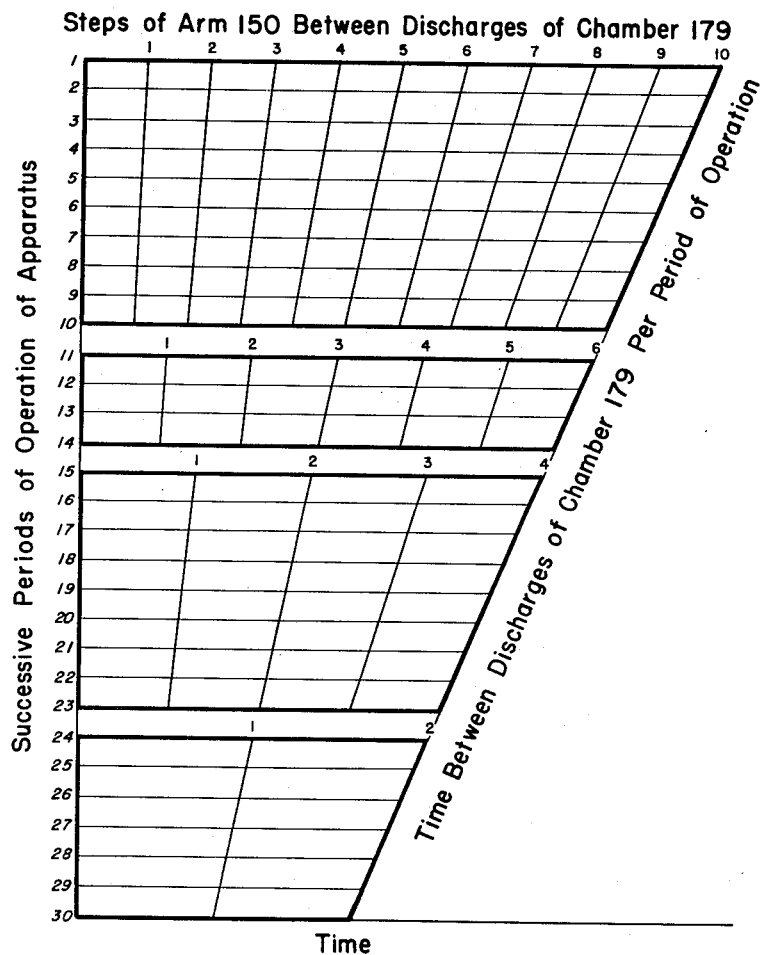

Figs. 7 thru 11 are views in section through the condenser of Fig. 6;

Fig. 12 is a view illustrating the connection between the condenser of Fig. 6 and the dispenser of Fig. 3;

Fig. 13 is a view in section of the condenser positioned outside of the growing chamber in the embodiment of the invention illustrated by Fig. 2;

Fig. 14 is a diagram illustrating the automatic temperature control circuit;

Fig. 15 is a diagram of the program control circuit indicated by reference character 107 of Fig. 1; and Fig. 16 is a timing chart illustrating the functioning of the program control circuit of Fig. 15.

Referring now to the accompanying drawings in which like numerals of reference are employed to designate like parts, and more particularly to Fig. 1 thereof in which reference character 4 designates a jar containing the crystallizing solution. Jar 4 is located within a tank 1 provided with a cover 7. Within tank 1 and around jar 4 is a suitable bath 3 such as water that supplies heat to the solution in jar 4. Calrod heater 2 supplies the heat lost by radiation, conduction and convection so that the temperature within container 4 may be maintained within narrow limits. The current supplied to Calrod heater 2 is controlled by the apparatus illustrated by 26, Fig. 14. Reference character 24 designates a well known type of thermal switch with taps A and B. Connected to tap B and the 110 volt A. C. source 169 is the armature of the relay indicated generally by 25. The armature 27 and contact 28 of relay 25 are arranged to connect the winding of relay 29 to A. C. source 169. Armature 27 is biased against contact 28 by spring 34. The armature 31 and contact 32 at relay 29 are arranged to connect the Calrod heater 2 to the 220 volt A. C. source 33. Armature 31 is biased to open position by spring 35.

When the temperature of the bath 3 drops below the desired value, the mercury in thermal switch 24 drops below point B and thereby opens the circuit energizing solenoid 25. Armature 27 is then pulled against contact 28 by spring 34 thereby energizing solenoid 29. Energizing solenoid 29 causes the armature 31 to be pulled against contact 32 which closes the circuit that applied the energy from the A. C. source 33 to Calrod heater 2.

When the bath 3 is heated to the desired temperature, the mercury of thermal switch 24 will rise until contact is made at B. When contact is made at B, coil 25 is energized and armature 27 is pulled away from contact 28, coil 29 is deenergized and spring 35 pulls armature 31 away from 32 thereby opening the circuit energizing heater 2.

Mounted on shaft 8 that passes through the lid 5 of container 4 is a tree 6. Crystal seeds are mounted on the extremities of the three lower pairs of arms of the tree. Blocks are mounted on the extremities of the upper pair of arms in order that sufficient stirring of the top layer of solution will be accomplished to reduce the possibility of spontaneous seeding due to evaporation at the surface of the solution. The tree 6, and the blocks mounted thereon, are rotated in such a manner as to produce frothless waves approximately 1½" high.

Whereas the specification has herein described the crystal supporting tree with blocks mounted thereon as specific means for producing frothless waves, it will be understood that other means such as separate drive for the stirring blocks could be used to produce the same result. Further, it will be understood that blocks of various shapes positioned at various depths below the surface of the crystallizing solution will produce frothless waves of the type desired for growing clear and flawless crystals.

The upper area of the container 4, i. e. the area above lid 7 is maintained at a temperature below the temperature of the solution so that water will condense on this area and dissolve spurious crystals that may form on this area due to splashing thereon during the start up period. Further, the condensed liquid reduces the saturation of solution washed up on the area above lid 7 during the growing process and thereby reduces the possibility of spontaneous seeding on this area.

One of the factors influencing the rate of growth of crystals is the uniform application of the crystallizing solution to the growing faces of the seeds. This is accomplished by careful control of the circulation around the growing seeds. Proper circulation of the solution around the growing seed is obtained, in the instant invention, by periodically reversing the direction of rotation of the tree to which the crystals are attached. It should be understood however that satisfactory crystals may be grown at a reduced rate of growth by using a method which does not involve reversing the direction of rotation of the tree to which the crystals are attached. The reversing of tree 6 is controlled by motor reverse control 51. Keyed to shaft 8 of tree 6 is a pulley 9 which is rotated by a belt 11 driven by reversible motor 10.

Whereas the specification has herein described the crystal tree as being supported by a shaft that extends through the lid on the top of the container it will be understood that the tree could be driven by a shaft extending through a suitable packing gland in the bottom of the container.

Crystal growing with the apparatus of the subject invention is done by evaporation of the solution at constant temperature.

The withdrawing of salt from the crystallizing solution and the depositing of it on the crystal seed makes it necessary to remove water from the solution. This is necessary in order to maintain the saturation of the crystallizing solution at the level of supersaturation necessary for the growing of crystals. Removal of water from the solution is accomplished by condenser 12 shown by Figs. 6 thru 11. The cooling element 13 of condenser 12 has a U-shaped passageway 54 which is connected to a cold water supply tube 14. Tube 15 drains the cooling water from the condenser. Fins 16 are attached to cooling element 13 to increase the heat transfer surface of the condenser. Container 17 is provided with ports 18 to permit the water vapor to circulate around the cooling surface of the condenser. The water that forms on the cooling surface is collected in the bottom of container 17. When the water reaches the top of lip 19 it closes ports 18 and stops the circulation of water vapor around the cooling fins which greatly reduces the rate of condensation. This assists in preventing the formation of a more saturated layer on the surface of the solution which would increase the probability of spontaneous seeding.

Inserted in one end of passageway 20 of element 13 is a beveled tube 21. Attached to the other end of passageway 20 is a tube 22 that is connected to a short tube 180 inserted in Lucite block 181 of device 175. Passageway 182 in block 181 connects the chamber 179 to tube 180. Capillary tube 188 is mounted in the top of measuring chamber 179 to provide an air vent for this chamber. The device 175 is mounted in relation to the container 17 of condenser 12 so that water will siphon from container 17 into chamber 179. The relative position of the chamber 179 and container 17 is such that chamber 179 will contain a predetermined volume when the liquid level in chamber 179 equals the liquid level in container 17 at which time the siphoning stops. The aforesaid predetermined volume being determined by the size of seed crystals and the rate of growth desired.

The siphoning of liquid from container 17 to chamber 179 is initially started by means of external suction and is caused during the growing cycle by the discharging of liquid from chamber 179. The liquid discharged from chamber 179 is conveyed to beaker 52. Chamber 179 is discharged by energizing solenoid coil 174 which pulls core 183 and plug valve 178 to the right. The valve 178 is only opened for a brief period of time since the coil 174 is only energized momentarily.

Passageway 186 from chamber 179 is of sufficient size however, to cause complete discharge of the liquid in chamber 179 during the brief interval of time that plug valve 178 is drawn to open position. The passageway 182 is also sufficiently small so that a negligible amount of liquid enters chamber 179 during the brief period of time that plug valve 178 is in the open position. The core 183 is biased toward the left by spring 184. When the coil 174 is deenergized therefore, plug valve 178 is pushed to the left until it is in abutting relation with valve seat 185. Valve 178 is equipped with a washer to permit a liquid tight seal between the valve and seat. When the plug valve 178 has been seated chamber 179 starts to fill as a result of the siphoning from container 17 through tube 21, passageway 20, tubes 22 and 180, and passageway 182.

Although a siphon arrangement has been described herein for transferring liquid from condenser 12 to dispensing device 175 it should be understood that other arrangements which do not involve a siphon may be used to obtain the same result.

As the crystals grow the surface areas presented to the crystallizing solution are gradually increased and larger quantities of salt are deposited on the crystals which necessitates the removal of water from the solution at an increasing rate to maintain a constant supersaturation of the crystallizing solution. Program control 107 to be described subsequently is constructed and arranged to cause the rate at which device 175 is operated for discharging liquid to increase directly in accordance with the rate of development of the surface area of the crystals.

During the crystal growing process it is necessary to add make-up solution to container 4 in order that the level of liquid in this container will be maintained at a constant value. The make-up solution in container 53 is conveyed to container 4 through tube 39, solenoid valve 38 and hand valve 37. The solenoid valve 38 is opened by the same current impulse from program control 107 that energizes solenoid 174 of device 175. Although in the instant invention make-up solution is conveyed to the growing chamber simultaneously with removal of condensate from this chamber it will be understood that the make-up solution need not be added simultaneously with removal of condensate. Make-up solution should be added as often as is necessary to maintain the stirring blocks submerged in the growing solution.

The saturation and pH value of the make-up solution are both preferably controlled and may be varied during the growth cycle to maintain an optimum supersaturation and prevent the pH value of the growing solution from exceeding the maximum value of the desired range.

The valve 38 is not closed simultaneously with the deenergizing of solenoid 174. It is necessary for the solenoid valve 38 to remain in the open position a predetermined period of time so that the proper amount of liquid will be added slowly to container 4. Time delay 36 of a well known and conventional type is used to delay the deenergizing of solenoid 38 the required period of time. Time delay 36 is energized by source 169 through leads 190 and 191.

Referring to Fig. 2, there is shown thereon an alternative arrangement for growing crystals by evaporation of the solution at constant temperature in which dehydrated air is passed through the space above the crystallizing solution for removing the excess water vapor in container 4. Dehydration of the air is accomplished by condenser 40. Blower 41 draws the dehydrated air from condenser 40 through duct 42. The dehydrated air is then forced through valve 43, duct 44, meter 45, duct 46, and diffuser 47 to container 4. After the air becomes laden with moisture in container 4 it is drawn through duct 48 to condenser 40 where the moisture is removed. The cooling water enters condenser 40 through tube 14, circulates around the corrugated cooling surface 50 and discharges through tube 15. The water condensed in condenser 40 is discharged through tube 51 to beaker 52.

It is apparent from Fig. 2 that blower 41 and solenoid 38 are connected in parallel across time delay 36. Blower 41 operates therefore at the same time that solenoid valve 38 in energized. Moisture is therefore removed from container 4 simultaneously with the addition of make-up fluid from container 36. Program control 107 is constructed and arranged to intermittently operate blower 41 and solenoid 38 in accordance with a predetermined schedule of crystal growth.

Time clock 60 of program control 107 is arranged to close switch 101 momentarily after the lapse of a constant and predetermined period of time such as every 12 hours or every day. The closing of switch 101 causes the discharge of condenser 102 through the stepper switch coil 61. Condenser 102 is charged from selenium rectifier 103 through leads 104 and 105 and resistance 106 after switch 101 has been opened. When condenser 102 discharges through coil 61 the armature (not shown) of the switch is pulled back. When the condenser has become discharged a predetermined amount causing sufficient reduction in the energization of coil 61 to release the armature, arms 62 to 67 of stepper switches, indicated generally by reference characters 68 to 73 respectively, are advanced by the armature one step in a clockwise direction. Arms 63 and 66 of switches 69 and 72 respectively are connected to the arms 64 and 67 of switches 70 and 73 respectively by lead 87. The contacts of switches 70 and 73 are connected to the condenser 90 by lead 89. Condenser 90 is grounded at 91.

Connected across the contacts of stepper switches 69 and 72 are resistors of equal resistance. The resistors connected across the contacts of switch 69 are grouped in three banks of resistance 74, 75, and 76 and the resistors across the contacts of switch 72 are grouped in one bank of resistance 77. The four banks of resistance 74 to 77 are connected to the cathode 79 of full wave rectifier tube 78 by leads 80, 81, variable resistance 82, leads 83 to 85, and resistance 86.

The plates of rectifier tube 78 are connected to the transformer secondary 93. The cathode 79 of tube 78 is heated by energy derived from secondary coil 168. Secondary coils 93 and 168 are energized by primary coil 199 which is connected to alternating source of energy 169 through fuze 170. The center tap 92 of transformer secondary 93 is grounded at 94. Condenser 90 is charged by full wave rectifier tube 78 through a circuit including the following: cathode 79 of rectifier 78, resistance 86, leads 85, 84, 83, variable resistance 82, leads 81 and 80, one of the resistances $R_1$, $R_2$, $R_3$ and $R_4$, one of the four banks of resistance 74 to 77, arm 63 or 66, for example, bank 74 and arm 63, as indicated, lead 87, arm 64 or 67 of switch 70 or 73 respectively, this being arm 64 as indicated, and lead 89 to condenser 90. Condenser 90 is connected to resistance 95 by lead 89, switch 70 or 73, and leads 87 and 88. Resistance 95 is connected to the grid 97 of thyratron tube 96. Thyratron tube 96 and an RC circuit including the resistance of one of the banks of resistance 74 to 77 and condenser 90 comprise a relaxation oscillator. The frequency of the oscillator depends upon the time required to charge condenser 90. The rate of charging of condenser 90 depends on the amount of resistance of resistance banks 74 to 77 and also on the resistance of $R_1$, $R_2$, $R_3$, or $R_4$ inserted in the circuit between rectifier tube 78 and condenser 90. The amount of resistance of the particular bank of resistance in series with condenser 90 at a particular time will be progressively decreased as the arms 63 and 66 are stepped in a clockwise direction under the control of time clock 60. The time intervals are increased substantially between periods of operation 10 and 11, when $R_2$ is inserted in the circuit with resistance in bank 75, since $R_2$ is substantially greater than $R_1$. Likewise, when arm 63 contacts bank 76, $R_3$ which has a substantially higher resistance than $R_2$ is placed in the circuit with condenser 90, and the time constant is therefore, substantially increased between operation periods 14 and 15. Another similar increase in the time constant also occurs between period of operation 23 and 24 when $R_4$, of larger magnitude than $R_3$, is placed in the circuit.

Thyratron tube 96 fires when the charge on condenser 90 is adequate to render the tube conductive. The firing of tube 96 completes a circuit which energizes coil 115. This circuit includes cathode 79, resistance 86, leads 85 and 196, coil 115, leads 114 and 113, plate 99, cathode 98, leads 112, 111, 136, and 110 and center tap 92.

The energizing of coil 115 causes armature 116 to move into engagement with contact 117 which closes a circuit from condenser 90 to ground 94 thereby completely discharging condenser 90. This circuit includes lead 89, switch 70 or 73, switch arm 64 or 67, leads 88 and 118, armature 116, leads 119, 111 and 109.

Energizing coil 115 also causes armature 120 to move into engagement with contact 121 which closes a circuit from selenium disc rectifier 103 for energizing coil 122 comprising leads 104, 108 and 123, armature 120, contact 121, resistance 124, coil 122, and lead 111 back to rectifier 103. Selenium disc rectifier 103 is energized by secondary coils 171 and 172, which are energized by primary coils 199 and 173.

The energizing of coil 122 causes armature 126 to move into engagement with contact 128. The armature 126 and contact 128 close a circuit for charging condensers 131 and 132 from rectifier 103, through leads 104, 108 and 146, resistance 130, lead 129, armature 126, contact 128, and resistances 133 and 134 to condenser 131 and resistances 133 and 135 to condenser 132. When condensers 131 and 132 are charged adequately, thyratron tube 137 will become conductive and will fire. The firing of tube 137 causes a voltage drop across resistance 138 through a circuit comprising cathode 79 of rectifier 78, resistance 86, leads 85 and 84, resistance 138, plate 139, and cathode 140 of thyratron 137, leads 141, 111, 136 and 110 to center tap 92.

The voltage drop across resistance 138 is of sufficient magnitude to reduce the voltage applied to plate 139 below the value required to render the thyratron tube 137 conductive. Thyratron tube 137 is therefore extinguished. Since the plates 99 and 139 of tubes 96 and 137 respectively are connected by leads 113, condenser 142 and lead 143, the voltage on plate 99 will fall to the value of the voltage on plate 139. The reduction of voltage applied to plate 99 causes tube 96 to be extinguished. Thus, the tube 137 snuffs out tube 96.

The energizing of coil 122 causes armature 125 to move into engagement with contact 127 simultaneously with the engagement of armature 126 and contact 128. The engagement of 125 and 127 closes a circuit from rectifier 103 to stepper coil 144 of stepper switch 149. This circuit includes rectifier 103, leads 104, 108 and 146, resistance 130, armature 125, contact 127, lead 147, stepper coil 144, and leads 148, 120, and 111 back to rectifier 103. Stepper switch 149 comprises stepper coil 144, reset coil 145, rotating arm 150 and a plurality of contacts on which the rotating arm impinges. The stepper coil 144 causes the rotating arm 150 to move to the next succeeding contact whenever the coil receives an energizing impulse.

Connected to contacts C2, C4, C6, and C10 of stepper switch 149 are contact banks 156, 157, 158 and 159 respectively of switches 68 and 71. The arms 62 and 65 of switches 68 and 71 respectively are connected together by lead 160.

Coil 161 is energized by rectifier 103 through a circuit including the following: leads 111, 195, coil 161, leads 192 and 160; arm 62 and one of the banks of contacts 157, 158 and 159 or arm 65 and contact bank 156; the appropriate lead to the contacts on stepper switch 149, arm 150 and leads 194, 146, 108 and 104 to rectifier 103.

Energizing coil 161 causes armature 162 to engage contact 163 which closes a circuit between rectifier 103 and reset coil 145 comprising the following: lead 104, resistance 193, armature 162, contact 163, lead 166, reset coil 145, and leads 148, 109 and 111, back to rectifier 103. The energizing of reset coil 145 resets arm 150 at position X from which it again steps forward in a clockwise direction in accordance with the oscillation of tube 96.

The energizing of coil 161 also causes armature 164 to engage contact 165 which completes a circuit from the source of alternating current 169 comprising fuze 170, lead 177, coil 174, (Fig. 4), armature 164, contact 165 and lead 189. The energizing of coil 174 causes the withdrawing of valve plug 178 and discharging of liquid from chamber 179. Leads 177 and 189 are also connected to time delay 36, as shown in Fig. 1, which in turn actuates solenoid valve 38. In the modification of Fig. 2, leads 177 and 189 are connected to time delay 36 which in turn actuates both blower 41 and solenoid valve 38.

From the foregoing it is apparent that the firing of thyratron tube 96 causes the energization of coils 115, 122 and stepper coil 144 in the order named. The stepper coil 144 advances the rotatable arm 150 one step into engagement with the next succeeding contact each time thyratron tube 96 fires. The rate of firing of thyratron 96 and therefore the rate at which the rotating arm 150 steps around the contacts depends upon the rate of charging of condenser 90. The rate of charging of condenser 90 depends on the amount of resistance of resistance bank 74, 75, 76 or 77, as the case may be, that is connected in series between rectifier tube 78 and condenser 90. Time clock 60 in conjunction with relay coil 61 and switches 68, 69, 71 and 72 controls this resistance. Time clock 60 in conjunction with switches 68 and 71 also controls the number of steps of stepper switch 149 before resetting of the switch. When arm 62 of switch 68 is resting on any contact of contact bank 159 the arm 150 advances 10 steps to contact C10 before resetting. However, it should be noted that the rate of stepping of arm 150 increases as the arm 62 is advanced in a clockwise direction along contact bank 159 due to the progressive reduction of the quantity of resistance 74 connected in the aforedescribed RC circuit. When arm 62 is contacting contact bank 158 or 157 or when arm 65 is contacting bank 156 the arm 150 of stepper switch 149 advances 6, 4 and 2 steps respectively before resetting.

By careful analysis of Fig. 16, it is clearly apparent that between periods of operation 10 and 11 the time interval between steps of arm 150 suddenly increases, but, since the number of steps required between discharges decreases slightly, a similar result is obtained between periods of operation 14 and 15 and between 23 and 24.

It is noted that the energizing of coil 161 causes the simultaneous resetting of contact arm 150 and discharging of measuring chamber 179. It is evident, therefore, that the rate of discharging of chamber 179 is a function of the particular contact bank which arms 63 and 66 may impinge on as well as the position of one of these arms on a contact bank. The particular contact bank determines the steps arm 150 makes before resetting; the position of the contact arm on the bank of contacts controls the rate of stepping of arm 150.

The performance of the timing apparatus is best illustrated by the chart of Fig. 16 in which the ordinate represents the successive periods of operation of the crystal growing apparatus and the upper abscissa represents the steps made by the arm 150 between each discharge of chamber 179. The lower abscissa represents time and the slanting line on the right of the chart represents the time between discharges of chamber 179 for each period of operation. It is noted that the time between discharges of chamber 179 is gradually reduced from the first period of operation until the final period of operation. This is accomplished by varying the number of steps made by arm 150 between discharges and the time between steps.

Although electrical timing means has been set forth hereinbefore it is to be understood that any variation in the timing means resulting in the production of preselected control steps may be utilized for this invention.

In order to grow clear crystals which are free of internal strain with the hereinbefore described novel apparatus it was also necessary to develop new methods of utilizing this or similar apparatus for growing clear and flawless seeds and methods of growing crystals therefrom of the desired type and size.

To grow original seeds of lithium sulphate monohydrate which involves growth in all directions, a supersaturated solution with a pH range of 3 to 4 and a temperature of approximately 100° C. should be used. The pH range of 3 to 4 is below the optimum for the growing temperature of 100° C. This low pH may be considered as a means of producing strains in the growings seeds and thus results in an increase in thickness. To start crystal growth, a few crystals of lithium sulphate monohydrate salt are added to the crystallizing solution while the tree 6 is revolving therein. A few of these salt crystals will then attach to the arms of the tree and crystals of the crystallizing solution will form thereon. The resulting crystals will contain cracks and flaws due to the strains that produce growth in thickness. Seeds should be cut from the clearest section of the crystals and regrown in a solution with a pH of 6.5–7.3 at approximately 100° C. which will cause clear and flawless growth in length and width but will not cause appreciable growth in thickness. By this procedure the cracks that would result from growth in thickness will be eliminated. Seeds may be cut from the clearest portion of the resulting crystal and again regrown for further elimination of flaws.

The regrowing of seeds in the 6.5–7.3 pH solution should be repeated until clear and flawless crystal bars have been grown which are suitable for seed material. Seeds may be cut from these bars and other crystal bars may be grown therefrom. Seeds should be cut from the bars in such a manner that the seed faces will be within 1½° of the major natural faces of the crystal. Crystals grown from seeds which do not have faces substantially parallel to the major natural crystal faces will contain a multitude of cracks and flaws.

Clear and flawless crystal bars suitable for piezoelectric applications may be grown from seeds grown by the hereinbefore described process in suitable solutions of lithium sulphate monohydrate.

Supersaturated solutions of lithium sulphate monohydrate of a pH in the range between 6.5 and 8.1 and of a temperature in the range between 70° and 105° C. will support the growth in length and width of clear and flawless crystal bars of a thickness determined by the thickness of the seed material. It should be noted that these optimum ranges of the pH value for the hydrogen ion concentration vary with impurities of the salt and with the tendency of the solution to cause spontaneous seeding. In the lower part of the temperature range the pH value is more critical and should be somewhat higher for optimum growing of the crystal.

Crystal bars greater in thickness than the thickness of available seeds may be obtained by growing them from these seeds in a solution with a pH range of 4 to 5 at a temperature of approximately 100° C. The pH range of 4 to 5 is below the optimum for 100° C. growing temperature which, as hereinbefore explained, may be considered as producing strains in the growing bars which results in an increase in thickness of the crystal bar. The thicker crystal bars will contain cracks and flaws due to the strains that produce growth in thickness.

The strains and cracks may be eliminated by obtaining seeds from the clearest area of the thicker crystal bars and growing these seeds in a 6.5–7.3 pH solution at approximately 100° C., which as hereinbefore explained, does not cause appreciable growth in thickness but does produce clear growth in length and width. The cycle described herein for eliminating flaws and for increasing thickness may be repeated until clear and flawless crystal bars of the desired thickness have been produced.

The temperatures specified herein for use with various values of pH for the hydrogen ion concentration are optimum values for obtaining the maximum rate of crystal growth. It should be understood that satisfactory crystals may be grown at a rate of growth less than the maximum by growing these crystals at a temperature slightly more or less than the optimum.

The values of pH noted above were indicated by an electrode potential method of measurement using a Leeds and Northrup electrometer, and corresponding values as measured by organic indicators which change in color are somewhat higher for the same solution, particularly when measurements are made in the upper range of pH values.

Whereas the specification has heretofore set forth certain examples of a method and apparatus suitable for growing lithium sulphate monohydrate crystals under controlled conditions it should be understood that the same or similar apparatus and methods can be used to grow crystals from any solution of a material having a flat, or negative, or only slightly positive slope solubility curve.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. A device of the character disclosed for condensing water within an enclosed chamber having an atmosphere of water vapor therein comprising, in combination, a cup shaped member arranged upright within said chamber, an elongated cylindrical member having a plurality of radially and longitudinally extending fins secured at one end thereof and arranged to be interfittingly and telescopically received within said cup shaped member and in spaced relation with respect to the bottom of the cup member thereby to define a water collecting chamber in the bottom of the cup and a plurality of radially disposed chambers between said fins for passing water and water vapor therethrough into said water collecting chamber, conduit means extending from outside said enclosed chamber through said tubular member into fluid communication with said water collecting chamber, a second conduit means extending from outside said enclosed chamber through the length of the tubular member substantially to the bottom end thereof and then back through the member and outwardly of the enclosed chamber for passing a cooling fluid through the tubular member, and means forming a plurality of ports arranged circumferentially in said cup member in communication with said bottom and radially disposed chambers therein thereby to provide a plurality of paths for circulation of water vapor through said radially disposed chambers and outwardly of the cup member through said ports, said ports being so arranged as to cut off said water vapor paths when the water level in the cup member rises to a predetermined depth.

2. A device for condensing vapor within an enclosed container in combination with an enclosed container having a chamber therein, said device comprising a cup-shaped member adapted to be arranged upright within said chamber, an elongated cylindrical member having a plurality of radially and longitudinally extending fins adjacent one end thereof, said end of said cylindrical member being received within said cup-shaped member in spaced relation with respect to the bottom thereof to define a collecting chamber, said fins forming a plurality of radially disposed chambers communicating with said collecting chamber, conduit means extending from outside said container through said elongated cylindrical member into fluid communication with said collecting chamber, a second conduit extending from outside said container longitudinally through said cylindrical member substantially to the bottom end thereof and then back through said member and outwardly of said container for passing a cooling fluid through said cylindrical member, and means forming a plurality of ports arranged circumferentially in said cup-shaped member in communication with said collecting and radially disposed chambers thereby providing a plurality of paths for circulation of vapor through said radially disposed chambers, said ports being arranged to cut off said vapor paths when the liquid level in the cup member rises to a predetermined depth.

References Cited in the file of this patent
UNITED STATES PATENTS

| | | |
|---|---|---|
| 1,461,726 | Crafts | July 17, 1923 |
| 1,528,622 | Lind | Mar. 3, 1925 |
| 2,023,456 | Wentworth | Dec. 10, 1935 |
| 2,484,829 | Holden | Oct. 18, 1949 |
| 2,647,043 | Imber | July 28, 1953 |